US008537206B2

(12) United States Patent
Son et al.

(10) Patent No.: US 8,537,206 B2
(45) Date of Patent: Sep. 17, 2013

(54) METHOD OF CONTROLLING VIEW OF STEREOSCOPIC IMAGE AND STEREOSCOPIC IMAGE DISPLAY USING THE SAME

(75) Inventors: Hyeonho Son, Goyang-si (KR); Hoyoung Jung, Goyang-si (KR)

(73) Assignee: LG Display Co., Ltd., Seoul (KR)

( * ) Notice: Subject to any disclaimer, the term of this patent is extended or adjusted under 35 U.S.C. 154(b) by 496 days.

(21) Appl. No.: 12/615,635

(22) Filed: Nov. 10, 2009

(65) Prior Publication Data
US 2010/0201790 A1 Aug. 12, 2010

(30) Foreign Application Priority Data
Feb. 11, 2009 (KR) .................. 10-2009-0010889

(51) Int. Cl.
*H04N 9/47* (2006.01)
(52) U.S. Cl.
USPC ........................................................ 348/53
(58) Field of Classification Search
None
See application file for complete search history.

(56) References Cited

U.S. PATENT DOCUMENTS

| | | | | |
|---|---|---|---|---|
| 4,649,425 A | * | 3/1987 | Pund ................................ | 348/52 |
| 5,686,975 A | * | 11/1997 | Lipton ............................. | 349/15 |
| 5,781,229 A | * | 7/1998 | Zediker et al. ................... | 348/51 |
| 5,969,850 A | * | 10/1999 | Harrold et al. ................. | 359/320 |
| 7,688,509 B2 | * | 3/2010 | Vissenberg et al. ........... | 359/463 |
| 7,924,441 B1 | * | 4/2011 | Milanovi ....................... | 356/614 |
| 8,134,779 B2 | * | 3/2012 | Roh et al. ....................... | 359/465 |
| 8,217,996 B2 | * | 7/2012 | Kane et al. ....................... | 348/55 |
| 2006/0146046 A1 | * | 7/2006 | Longhurst et al. ............. | 345/418 |
| 2006/0232584 A1 | | 10/2006 | Utsugi et al. | |
| 2007/0176914 A1 | * | 8/2007 | Bae et al. ....................... | 345/204 |
| 2009/0167845 A1 | * | 7/2009 | Khan .............................. | 348/51 |
| 2010/0007582 A1 | * | 1/2010 | Zalewski ......................... | 345/8 |

OTHER PUBLICATIONS

Office Action issued in corresponding Korean Patent Application No. 10-2009-0010889, mailed May 10, 2013, 4 pages.

* cited by examiner

*Primary Examiner* — David Czekaj
*Assistant Examiner* — Tyler W Sullivan
(74) *Attorney, Agent, or Firm* — Brinks Hofer Gilson & Lione

(57) ABSTRACT

Provided is a method of controlling view of a stereoscopic image. The method includes changing the view angle and depth information of a 3D image displayed on a display according to position information for each user; and combining at least two of a spatial division technique spatially dividing light from the display, a time division technique temporally dividing light from the display and a polarization division technique dividing light from the display into lights having polarization characteristics to divide the 3D image for the each user by using the combined technique and producing a binocular disparity of for the each user.

13 Claims, 17 Drawing Sheets

Camera capture image

IR sensor image

METHOD OF CONTROLLING VIEW OF STEREOSCOPIC IMAGE AND STEREOSCOPIC IMAGE DISPLAY USING THE SAME

This application claims the benefit of Korea Patent Application No. 10-2009-0010889, filed on Feb. 11, 2009, the entire contents of which is incorporated herein by reference for all purposes as if fully set forth herein.

BACKGROUND

1. Field of the Invention

This disclosure relates to a method of controlling view of a stereoscopic image and a stereoscopic image display using the same.

2. Discussion of the Related Art

Stereoscopic image displays are classified into displays using a stereoscopic technique and displays using an autostereoscopic technique.

The stereoscopic technique uses a disparity image between the left and right eyes, which has large 3D effect and includes a technique using glasses and a technique using no glasses. The technique using glasses changes polarization directions of left and right disparity images and displays the left and right disparity images on a direct view display or a projector or displays the left and right disparity images on the direct view display or the projector using a time division method. The technique using glasses produces a stereoscopic image using polarizing glasses or liquid crystal shutter glasses. The technique using no glasses locates an optical plate such as a parallax barrier for separating optical axes of left and right disparity images from each other in front of or behind a display screen.

The technique using glasses alternately displays left-eye and right-eye images on a display and switches characteristic of polarized light incident on polarizing glasses. Accordingly, the technique using glasses can time-divide the left-eye and right-eye images to produce a stereoscopic image without deteriorating resolution.

Recently, the use of 3D (three dimensional) contents using stereoscopic images has been diversified into 3D games, 3D advertisements, 3D movies, etc. To extend the application fields and contents of stereoscopic images, there is a need to adaptively control the view angle and depth of a stereoscopic image according to a motion of a user.

BRIEF SUMMARY

A method of controlling view of a stereoscopic image includes detecting position information of each user and changing view angle and depth information of a 3D image displayed on a display according to the position information; and combining at least two of a spatial division technique spatially dividing light from the display, a time division technique temporally dividing light from the display and a polarization division technique dividing light from the display into lights having polarization characteristics which are different from one another to divide the 3D image for the each user by using the combined technique, and producing a binocular disparity of the each user.

According to another aspect of this disclosure, a stereoscopic image display device includes a controller that changes the view angle and depth information of a 3D image displayed on a display according to position information for each user; and a 3D driving element that divides the 3D image for respective users by using at least two of a spatial division technique spatially dividing light from the display, a time division technique temporally dividing light from the display and a polarization division technique dividing light from the display into lights having polarization characteristics which are different from one another, and produces a binocular disparity of the each user.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE DRAWINGS AND THE PRESENTLY PREFERRED EMBODIMENTS

Embodiments of the invention will be explained in detail with reference to FIGS. 1 through 16b.

Figure 1:
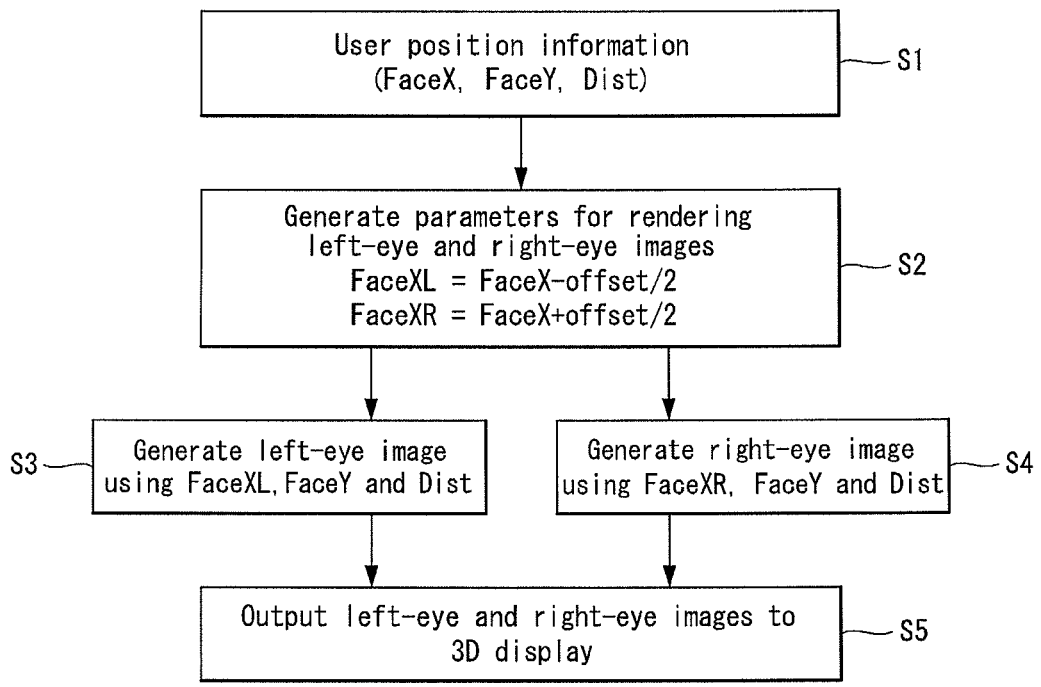
FIG. 1 is a flowchart showing a method of controlling view of a stereoscopic image according to an embodiment of this disclosure.

Referring to FIG. 1, a method of controlling view of a stereoscopic image according to an embodiment of the invention simultaneously acquires position information of a plurality of users (or observers) based on images obtained by an image sensor or outputs of an infrared sensor in step S1. The image sensor may be a camera. Position information of a user corresponds to 3D position information including X-axis position information FaceX of the face of the user, Y-axis position information FaceY of the user face, and a distance (or Z-axis position information Dist) between the user and the stereoscopic image display.

The method of controlling view of a stereoscopic image according to embodiment of the invention adjusts parameters for rendering view angles and depth information of left-eye and right-eye images displayed on the stereoscopic image display according to 3D position information of each user in step S2. A rendering parameter FaceXL of the left-eye image is "FaceXL=FaceX-offset/2", which is determined according to 3D position information of the face of each user. A rendering parameter FaceXR of the right-eye image is "FaceXR=FaceX+offset/2", which is determined according to the 3D position information of the face of each user. Here, "offset" corresponds to a distance between the left eye and the right eye of a user, that is, a distance between a camera for generating the left-eye image and a camera for generating the right-eye image. X-axis related parameters of the left-eye and right-eye images can be varied according to 3D position information of each user and Y-axis and Z-axis related parameters of the left-eye and right-eye images can be varied in real time according to Y-axis and Z-axis position information of each user.

The method of controlling view of a stereoscopic image according to the embodiment of the invention generates left-eye and right-eye images according to left-eye and right eye image rendering parameters and position information of each user and displays the left-eye and right-eye images on the stereoscopic image display in steps S3, S4 and S5. Views of the left-eye and right-eye images displayed on the stereoscopic image display are changed in real time according to the position of each user because the rendering parameters of the left-eye and right-eye images are updated whenever the position of each user is changed. Accordingly, the stereoscopic image display according to the invention can generate the view angle and depth information of a stereoscopic image, which are varied according to the position of each user, in real time and provide an unlimited stereoscopic image views to each user.

Figure 2:
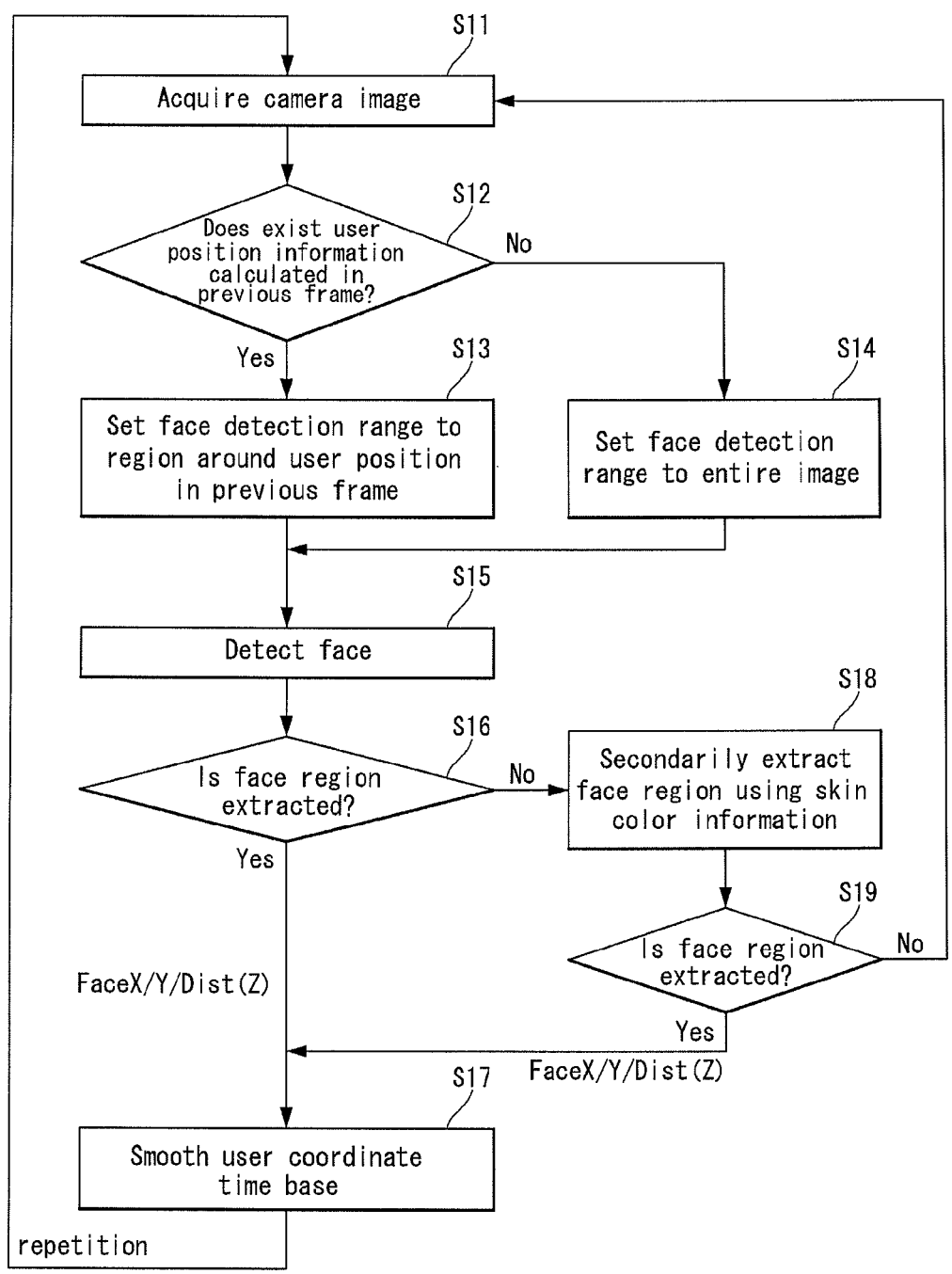
FIG. 2 is a flowchart showing a method of acquiring position information of a user based on a camera image in step S1 of FIG. 1.
Figure 3:
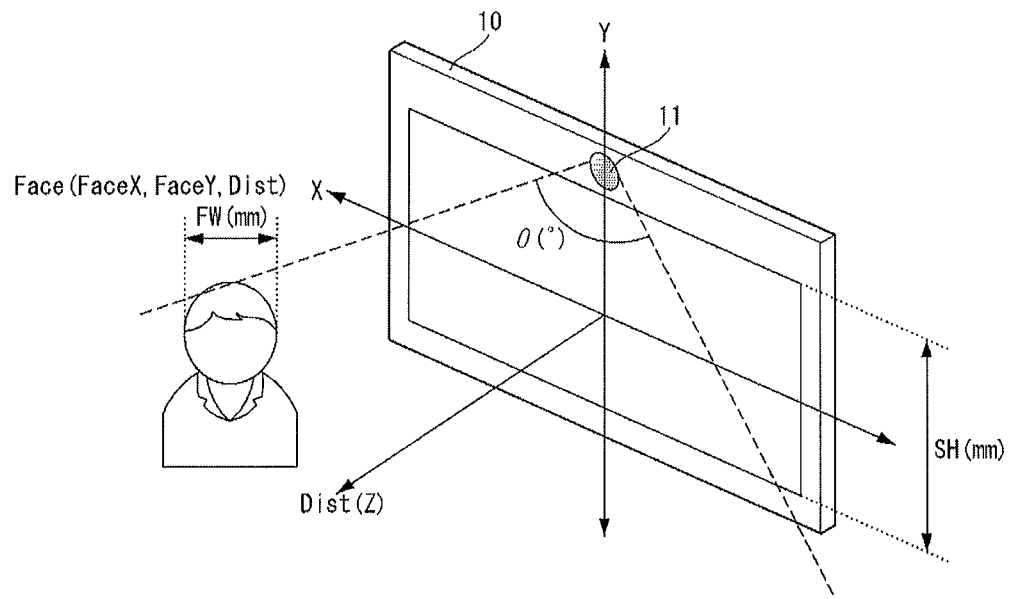
FIG. 3 illustrates a stereoscopic image display and 3D position information of a user who watches a stereoscopic image displayed on the stereoscopic image display.
Figure 4:
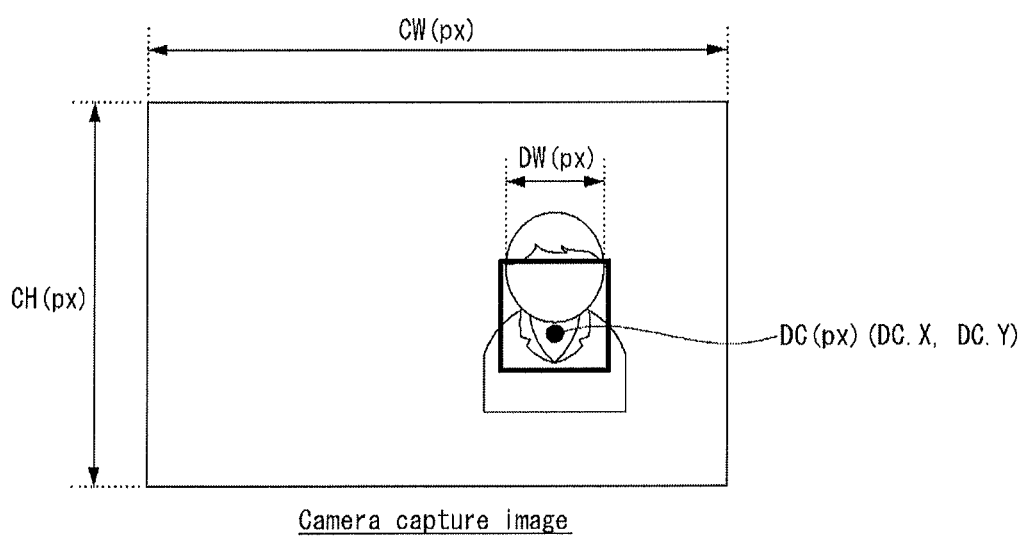
FIG. 4 illustrates a camera capture image captured by a camera illustrated in FIG. 3.

FIG. 2 is a flowchart showing a user position detection algorithm based on a camera image in step S1 of FIG. 1, FIG. 3 illustrates a stereoscopic image display 10 and 3D position information of a user who watches a stereoscopic image displayed on the stereoscopic image display 10, and FIG. 4 illustrates a camera capture image captured by a camera 11 attached to the stereoscopic image display 10.

Referring to FIGS. 2, 3 and 4, the stereoscopic image display 10 includes a display screen for displaying left-eye and right-eye images, a frame surrounding the display screen, and the camera 11 attached to the frame. When a user is located in a view angle of the camera 11, an image captured by the camera 11 includes a user image. The camera capture image illustrated in FIG. 4 includes a pixel matrix having a size of CW(px)×CH(px) determined according to the resolution of the camera.

The method of controlling view of a stereoscopic image analyzes the camera capture image of the current frame, as illustrated in FIG. 4, to determine whether position information of the user, calculated in a previous frame, exists in the camera capture image. When the position information calculated in the previous frame exists in the camera capture image of the current frame, the method of controlling view of a stereoscopic image sets a user face detection range to a region around the position of the user, calculated in the previous frame, in steps S11, S12 and S13. When the position information calculated in the previous frame does not exist in the camera capture image of the current frame, the method of controlling view of a stereoscopic image sets the user face detection range to the entire camera capture image of the current frame in steps S11, S12 and S14.

The method of controlling view of a stereoscopic image detects the face of the user within the user face detection range set in step S13 or S14 by using a known face detection algorithm to extract XYZ 3D position information FaceX, FaceY and Dist corresponding to the user face from the camera capture image in steps S15 and S16. Although "face detection algorithm of Viola & Jones" may be used as the face detection algorithm, the face detection algorithm is not limited thereto and any face detection algorithm can be applied. The face detection algorithm of Viola & Jones is represented by Equations 1, 2, 3 and 4. In Equations 1, 2, 3 and 4, parameters FW(mm), SH(mm), θ(°), CW(px) and CH(px) are constants determined by the stereoscopic image display 10, the camera 11 and the camera capture image illustrated in FIGS. 3 and 4 and DW(px), and DC(px) calculated from the camera capture image are variables calculated in real time according to a motion of a user by the face detection algorithm of Viola & Jones. Herein, FW denotes the face width of the user, SH denotes the screen height of the stereoscopic image display 10, θ represents the angle at which the user watches a stereoscopic image, CW represents the width of the camera capture image, CH denotes the height of the camera capture image, DW represents a detected width of the user face, which is detected from the camera capture image, and DC represents a detected center of the user face, which is detected from the camera capture image.

$$RPP = \frac{\pi}{360} \cdot \theta \cdot CW \qquad \text{[Equation 1]}$$

Here, RPP denotes "Radians per pixel" and CW represents the width of a camera capture image.

$$Dist = \frac{\left(\frac{FW}{2}\right)}{\tan\left(RPP \cdot \frac{DW}{2}\right)} \qquad \text{[Equation 2]}$$

Here, Dist denotes a face distance between the stereoscopic image display 10 and the user in FIG. 3.

$$FaceX = \sin\left(RPP\left(DC.X - \frac{CW}{2}\right)\right) \cdot Dist \qquad \text{[Equation 3]}$$

Here, FaceX represents the position of the user face on the X axis in FIG. 3 and DC.X denotes the X-axis pixel position of the center of the user face detected from the camera capture image.

$$FaceY = \sin\left(RPP\left(DC.Y - \frac{CH}{2}\right)\right) \cdot Dist - \frac{SH}{2} \qquad \text{[Equation 4]}$$

Here, FaceY represents the position of the user face on the Y axis in FIG. 3 and DC.Y denotes the Y-axis pixel position of the center of the user face, which is detected from the camera capture image.

If detection of the user face from the camera capture image fails in steps S11 through S16, the method of controlling view of a stereoscopic image recognizes a region including a widest portion in a skin color in the camera capture image as the user face and re-performs steps S11 through S16 to detect the user face and extract XYZ 3D position information FaceX, FaceY and Dist in steps S17 and S18.

The method of controlling view of a stereoscopic image averages 3D position information FaceX, FaceY and Dist of the user face facing the stereoscopic image display 10, which is extracted by repeating steps S16, S17 and S18 for a predetermined frame period, for example, a period corresponding to several tens of frames in step S19. This is for the purpose of smoothing user position information on the time base to determine 3D position information of the final user face because the user position information may slightly change according to minute noise included in the camera capture image even when the user does not move.

Figure 5:
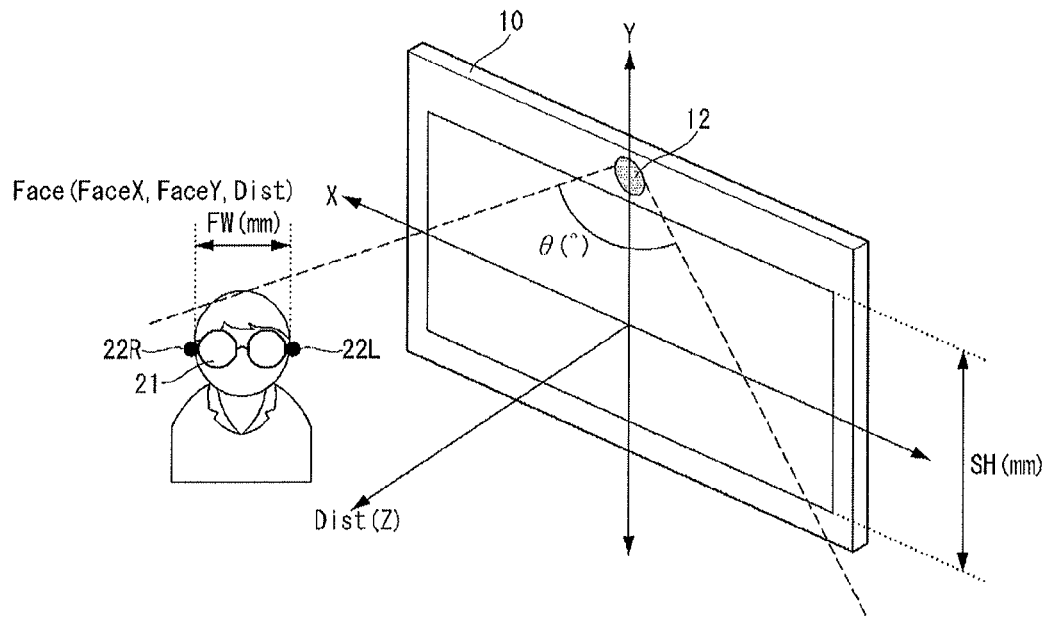
FIG. 5 illustrates a method of acquiring position information of a user based on an infrared sensor output in step S1 of FIG. 1, which shows a stereoscopic image display having an infrared sensor and 3D position information of a user face.
Figure 6:
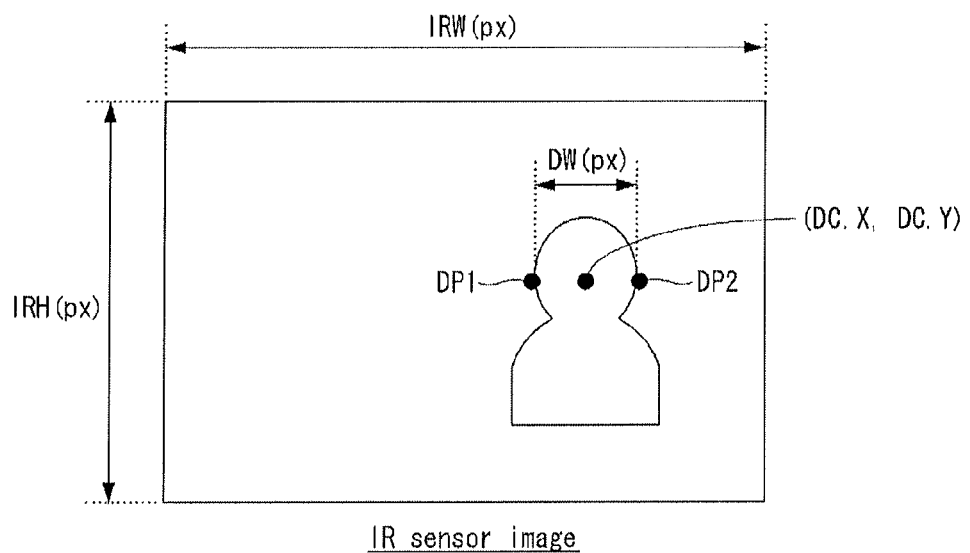
FIG. 6 illustrates an infrared receiving pixel position detected by the infrared sensor illustrated in FIG. 5.

FIGS. 5 and 6 illustrate a user position detection algorithm based on an infrared sensor output in step S1 of FIG. 1.

Referring to FIGS. 5 and 6, the stereoscopic image display 10 includes a display screen displaying left-eye and right-eye images, a frame surrounding the display screen, and an infrared sensor 12 attached to the frame. A user wears 3D polarizing glasses 21 having left and right infrared ray emitting devices 22L and 22R. When the user who is wearing the 3D polarizing glasses 21 is located in the sensing range of the infrared sensor 12, the infrared sensor 12 receives infrared rays from the left and right infrared ray emitting devices 22L and 22R of the 3D polarizing glasses 21. The infrared sensor 12 includes a sensor matrix having a size of IRW(px)×IRH (px) determined according to sensor resolution, as illustrated in FIG. 6.

The method of controlling view of a stereoscopic image detects infrared receiving points DP1 and DP2 from the output of the infrared sensor 12, as illustrated in FIG. 6, in step S1 of FIG. 1 and calculates the detected width DW of the user face, XY coordinates DC.X and DC.Y of the center point of the user face and 3D position information FaceX, FaceY and Dist of the user face by using Equations 5 through 11.

$$DW = \sqrt{(DP1.X - DP2.X)^2 + (DP1.Y - DP2.Y)^2} \qquad \text{[Equation 5]}$$

Here, DW denotes a distance between the left and right infrared ray emitting devices 22L and 22R, which is detected from the infrared sensor 12.

$$DC.X = \frac{DP1.X + DP2.X}{2} \qquad \text{[Equation 6]}$$

Here, DC.X denotes the coordinate value of the center point of the user face on the X-axis.

$$DC.Y = \frac{DP1.Y + DP2.Y}{2} \qquad \text{[Equation 7]}$$

Here, DC.Y represents the coordinate value of the center point of the user face on the Y axis.

[Equation 8]

$$RPP_{IR} = \frac{\pi}{360} \cdot \theta \cdot EIRW \qquad \text{[Equation 8]}$$

Here, $RPP_{IR}$ represents "Radians per pixel" and IRW denotes the width of the infrared sensor output.

[Equation 9]

$$Dist = \frac{\left(\frac{FW}{2}\right)}{\tan\left(RPP_{IR} \cdot \frac{DW}{2}\right)} \qquad \text{[Equation 9]}$$

Here, Dist denotes the face distance between the stereoscopic image display 10 and the user in FIG. 5.

[Equation 10]

$$FaceX = \sin\left(RPP_{IR}\left(DC.X - \frac{IRW}{2}\right)\right) \cdot Dist \qquad \text{[Equation 10]}$$

Here, FaceX denotes the X-axis position of the user face in FIG. 5 and DC.X represents the X-axis coordinate value of the center of the user face, which is detected from the infrared sensor output.

[Equation 11]

$$FaceY = \sin\left(RPP_{IR}\left(DC.Y - \frac{IRH}{2}\right)\right) \cdot Dist - \frac{SH}{2} \qquad \text{[Equation 11]}$$

Here, FaceY denotes the Y-axis position of the user face in FIG. 5 and DC.Y represents the Y-axis coordinate value of the center of the user face, which is detected from the camera capture image. IRW denotes the width of the infrared sensor output and SH represents the screen height of the display screen of the stereoscopic image display 10.

Figure 7:
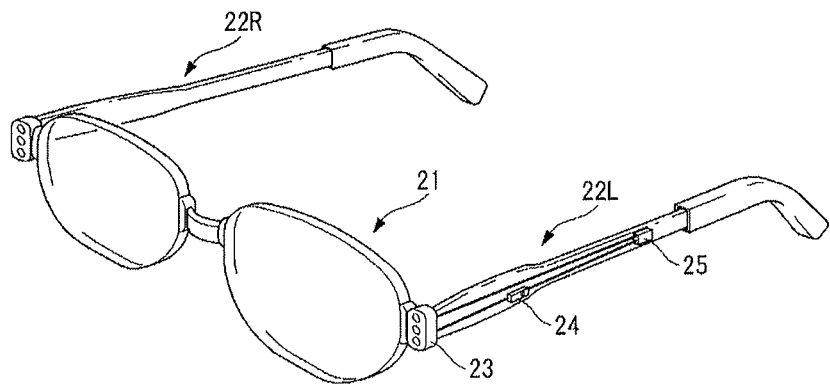
FIG. 7 illustrates an infrared ray emitting device of 3D polarizing glasses illustrated in FIG. 5.

FIG. 7 shows the infrared ray emitting devices 22L and 22R of the 3D polarizing glasses 21 illustrated in FIG. 5 in detail.

Referring to FIG. 7, each of the infrared ray emitting devices 22L and 22R includes an infrared light emitting diode (LED) module 23, a switch element 24 and a battery 25. The infrared LED module 23 includes one or more infrared LEDs connected in series or in parallel. The switch element 24 switches a current path between the infrared LED module 23 and the battery 25 according to an operation of a user.

Although FIGS. 5 and 6 illustrate a single user, position information of a plurality of users can be simultaneously sensed by using cameras or infrared sensors.

Figure 8:
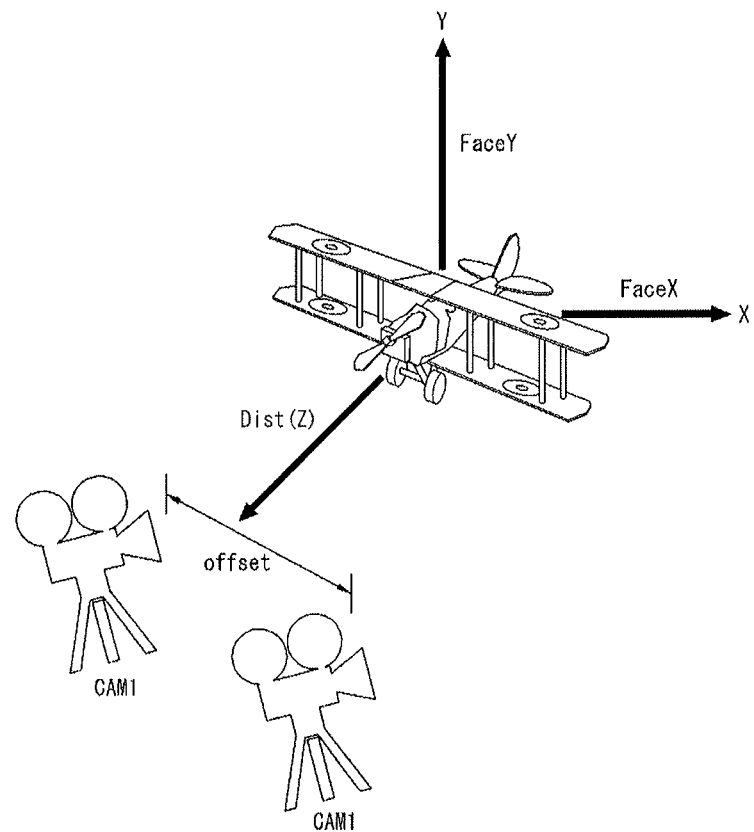
FIG. 8 illustrates an example of a change in the positions of cameras generating left-eye and right-eye images in real time according to 3D position information of a user.

The method of controlling view of a stereoscopic image renders left-eye and right-eye images using the 3D position information of the user, calculated in steps S1 and S2, as rendering parameters, as illustrated in FIG. 8. The method of controlling view of a stereoscopic image of the invention does not store images of a 3D object at every angle and generates left-eye and right-eye images obtained when left-eye and right-eye cameras CAM1 and CAM2, which are located at a distance corresponding to the offset between the left and right eyes of the user from each other, face the 3D object by using 3D modeling application programming interface (API), such as OpenGL and Direc3D. The invention adjusts the left-eye camera position and the right-eye camera position at a distance corresponding to the offset of the left and right eyes of the user from each other, which face the same 3D object, that is, parameters determining view angles and depth information of left-eye and right-eye images, in real time using the API according to the 3D position information of each user, which is calculated in steps S1 and S2.

The stereoscopic image display of the invention renders the left-eye and right-eye images according to the rendering parameters varied according to the 3D position information of each user, separately displays the left-eye and right-eye images on the stereoscopic image display 10 and adjusts the view angle and depth information of a stereoscopic image. Consequently, the stereoscopic image display of the invention varies rendering of the left-eye and right-eye images in real time according to a motion of each user to produce a stereoscopic image that can be seen as an unlimited number of views according to a motion of each user.

Figure 9:
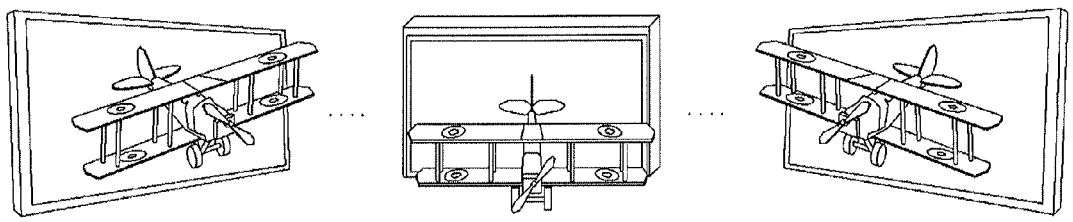
FIG. 9 illustrates an example of real-time adjustment of the view angle and depth information of a 3D image according to a variation in the position of a user.

Referring to FIG. 9, when a user moves from the front of the stereoscopic image display 10 to the left, the 3D position information of the user is changed. Accordingly, left-eye and right-eye images displayed on the stereoscopic image display 10 are rendered according to the changed 3D position information of the user, and thus the user can watch a 3D object image having a view angle and depth information which are moved from the center of FIG. 9 to the left as a stereoscopic image. When the user moves from the front of the stereoscopic image display 10 to the right, as illustrated in FIG. 9, the 3D position information of the user is changed. Accordingly, the left-eye and right-eye images displayed on the stereoscopic image display 10 are rendered according to the changed 3D position information of the user, and thus the user can watch a 3D object image having a view angle and depth information which are moved from the center of FIG. 9 to the right as a stereoscopic image.

The invention detects the position of each user in real time using the user position detection algorithm and adjusts rendering parameters of a 3D object image according to 3D position information of each user. Furthermore, the invention combines a spatial division 3D technique (various parallel barrier or lens techniques), a time division 3D technique and a polarization division 3D technique (polarizing glasses type) to separate 3D images of users, as illustrated in FIGS. 10 through 16b. Since 3D images seen to respective users are separated according to the spatial division, time division or polarization division technique, each user can watch a 3D image having a view angle and depth information which are adjusted in real time according to the position of each user.

Figure 10:
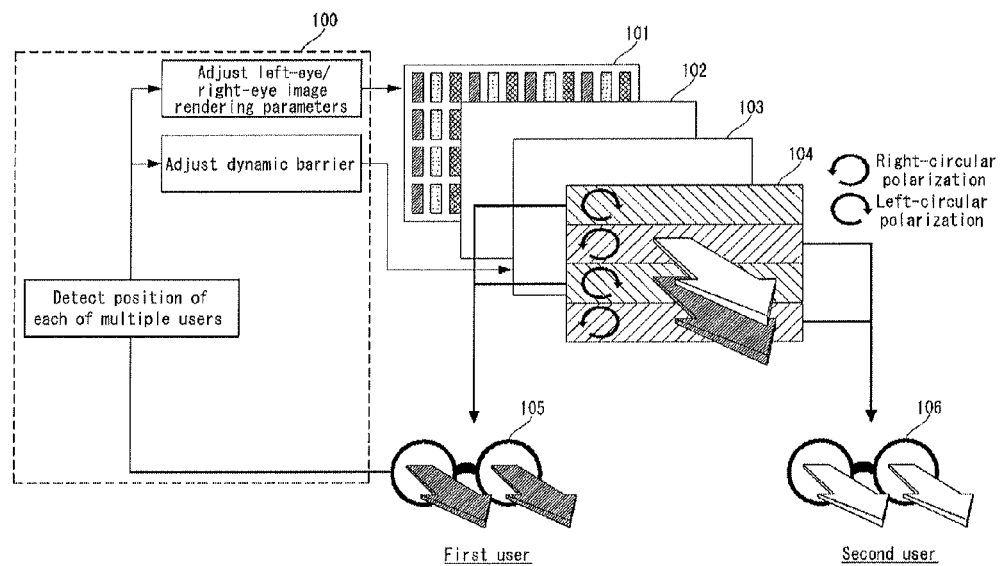
FIG. 10 illustrates a stereoscopic image display according to a first embodiment of this disclosure.
Figure 11:
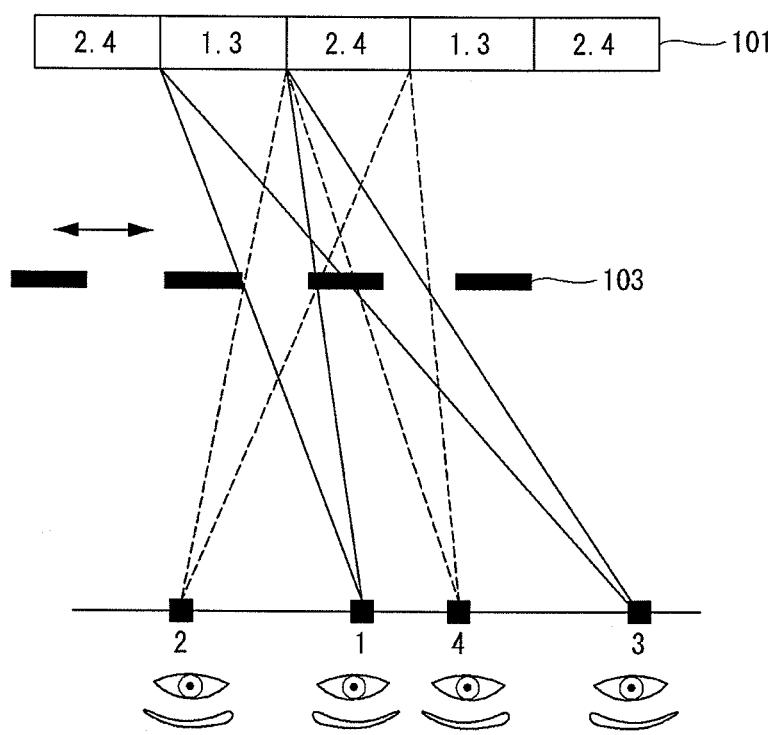
FIG. 11 illustrates light of a left-eye image and light of a right-eye image, which are separated from each other by a dynamic barrier illustrated in FIG. 10.

Referring to FIGS. 10 and 11, a stereoscopic image display according to a first embodiment of the invention includes a display 101, a dynamic barrier 103, a pattern retarder 104, a plurality of polarizing glasses 105 and 106, and a 3D controller 100. The dynamic barrier 103, the pattern retarder 104 and the polarizing glasses 105 and 106 are 3D driving elements which separate 3D images for respective users and produce binocular disparities of the respective users.

The display 101 may be a liquid crystal display, a field emission display, a plasma display panel, or an electroluminescence device (EL) including an inorganic electroluminescence device and an organic light emitting diode (OLED). When the display 101 is a liquid crystal display, a polarizer 102 is arranged between the display unit 101 and the dynamic barrier 103. The display 101 displays a 2D image in a 2D mode and displays a 3D image rendered according to a user position under the control of the 3D controller 100 in a 3D mode.

The dynamic barrier 103 may be implemented as a liquid crystal barrier having two transparent substrates on which electrodes are formed and a liquid crystal layer formed between the transparent substrates or a liquid crystal lens. The dynamic barrier 103 electrically controls liquid crystal molecules under the control of the 3D controller 100 to spatially divide lights of left-eye and right-eye images. FIG. 11 illustrates an example of the operation of the dynamic barrier 103.

The dynamic barrier 103 can electrically control liquid crystal molecules to move positions of a transmitting part transmitting light and a blocking part blocking light in the horizontal direction. Accordingly, the dynamic barrier 103 spatially divides lights incident on the left and right eyes of each user to produce a binocular disparity of each user.

The pattern retarder 104 includes first and second retarders having different light absorption axes and splits a 3D image into polarized lights for each user. The first retarder is formed on an odd-numbered line of the pattern retarder 104 and transmits a first polarized light (linearly polarized light or circularly polarized light) of lights input through the dynamic barrier 103. The second retarder is formed on an even-numbered line of the pattern retarder 104 and transmits a second polarized light (linearly polarized light or circularly polarized light) of the lights input through the dynamic barrier 103. In FIG. 10, the first retarder is implemented as a polarization filter which transmits right-circularly polarized light and the second retarder is implemented as a polarization filter which transmits left-circularly polarized light.

The polarizing glasses 105 and 106 have different light absorption axes according to polarized lights projected from the pattern retarder 104. For example, the first polarizing glasses 105 worn by a first user transmits the right-circularly polarized light received from the first retarder of the pattern retarder 104 and blocks other polarized components. The left and right glasses of the first polarizing glasses 105 include right-circular polarizing filters. The second polarizing glasses 106 worn by a second user transmits the left-circularly polarized light received from the second retarder of the pattern retarder 104 and blocks other polarized components. The left and right glasses of the second polarizing glasses 106 include left-circular polarizing filters.

The 3D controller 100 acquires 3D position information of each user from a camera or an infrared sensor by using the aforementioned user position detection algorithm. In addition, the 3D controller 100 adjusts rendering parameters of left-eye and right-eye images of a 3D image and controls the dynamic barrier 103 according to the 3D position information of each user.

Figure 12:
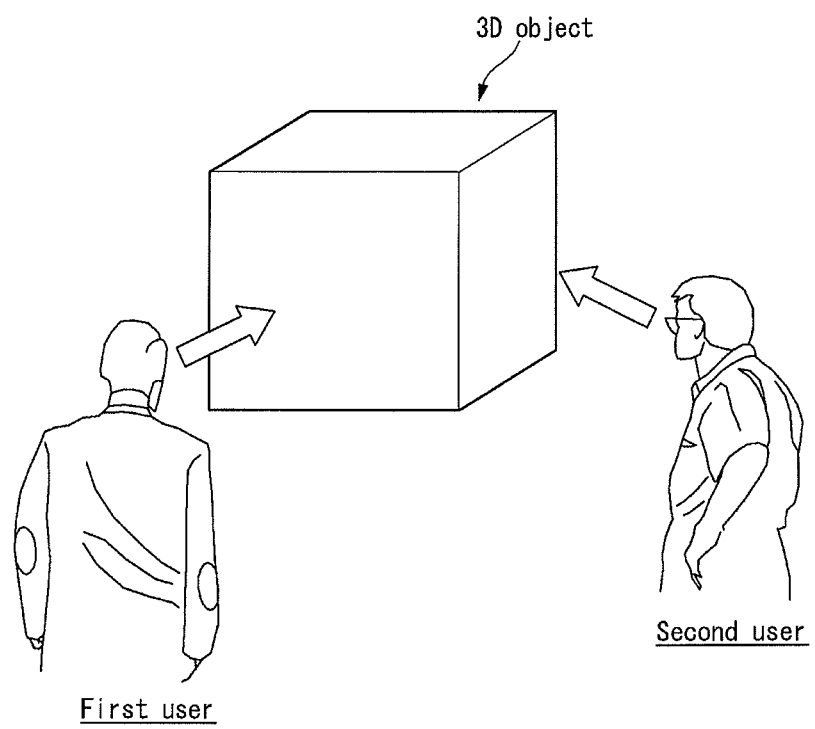
FIG. 12 illustrates a 3D object image seen to users.

The stereoscopic image display illustrated in FIG. 10 can separate users according to polarization division using the pattern retarder 104 and the polarizing glasses 105 and 106 and produce a disparity of each user according to spatial division using the dynamic barrier 103. The stereoscopic image display detects the position of each user by using the camera or the infrared sensor, adjusts the view angle and depth information of a 3D image and controls the dynamic barrier 103 to achieve multi-user tracking. Accordingly, users can differently watch a 3D object image displayed on the stereoscopic image display at different view angles and watch a 3D object having depth information varied according to positions of the users, as illustrated in FIG. 12.

Figure 13:
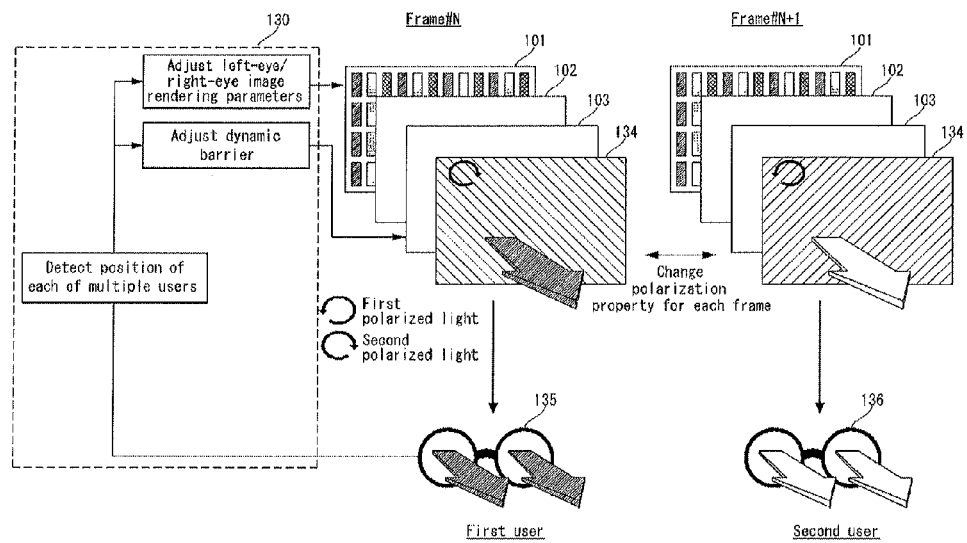
FIG. 13 illustrates a stereoscopic image display according to a second embodiment of this disclosure.

FIG. 13 illustrates a stereoscopic image display according to a second embodiment of the invention.

Referring to FIG. 13, the stereoscopic image display according to the second embodiment of the invention includes the display 101, the polarizer 102, the dynamic barrier 103, a dynamic retarder 134, a plurality of polarizing glasses 135 and 136, and a 3D controller 130. The dynamic barrier 103, the dynamic retarder 134 and the polarizing glasses 135 and 136 are 3D driving elements which separate 3D images for respective users and produce a binocular disparity of each user.

The display 101 displays a 2D image in the 2D mode and displays a 3D image rendered according to the position of a user under the control of the 3D controller 130 in the 3D mode.

The dynamic barrier 103 may be implemented as a liquid crystal barrier having two transparent substrates on which electrodes are formed and a liquid crystal layer formed between the transparent substrates or a liquid crystal lens. The dynamic barrier 103 electrically controls liquid crystal molecules under the control of the 3D controller 130 to spatially divide lights of left-eye and right-eye images.

The dynamic retarder 134 has a liquid crystal layer formed between transparent substrates on which electrodes are formed. The liquid crystal layer of the dynamic retarder 134 varies phase delay of light according to an electric field applied to liquid crystal molecules to adjust polarization of light. The dynamic barrier 103 changes polarization characteristic of light input to the polarizing glasses 135 and 136 at regular intervals under the control of the 3D controller 130. For example, the dynamic barrier 103 changes lights of left-eye and right-eye images, which travel to the polarizing glasses 135 and 136, to right-circularly polarized lights for an Nth frame (N is a positive integer) and changes lights of the left-eye and right-eye images, which travel to the polarizing glasses 135 and 136, to left-circularly polarized lights for an (N+1)th frame.

The polarizing glasses 135 and 136 have different light absorption axes according to polarized lights projected from the dynamic retarder 134. For example, the first polarizing glasses 135 worn by a first user transmits the right-circularly polarized light received from the dynamic retarder 134 and blocks other polarized components. The left and right glasses of the first polarizing glasses 135 include right-circular polarizing filters. The second polarizing glasses 136 worn by a second user transmits the left-circularly polarized light received from the dynamic retarder 134 and blocks other polarized components. The left and right glasses of the second polarizing glasses 136 include left-circular polarizing filters.

The 3D controller 130 acquires 3D position information of each user from a camera or an infrared sensor by using the aforementioned user position detection algorithm. In addition, the 3D controller 130 adjusts rendering parameters of left-eye and right-eye images of a 3D image and changes the position of the dynamic barrier 103 and the polarization property of the dynamic retarder 134 according to the 3D position information of each user.

The stereoscopic image display illustrated in FIG. 13 separates users according to polarization division using the dynamic retarder 134 and the polarizing glasses 135 and 136 and produces a binocular disparity of each user according to spatial division using the dynamic barrier 103. The stereoscopic image display detects the position of each user and adjusts the view angle and depth information of a 3D image to achieve multi-user tracking and changes the polarization property of the dynamic retarder 134 at regular intervals to prevent the resolution of a 3D image seen to each user from deterioration.

Figure 14A:
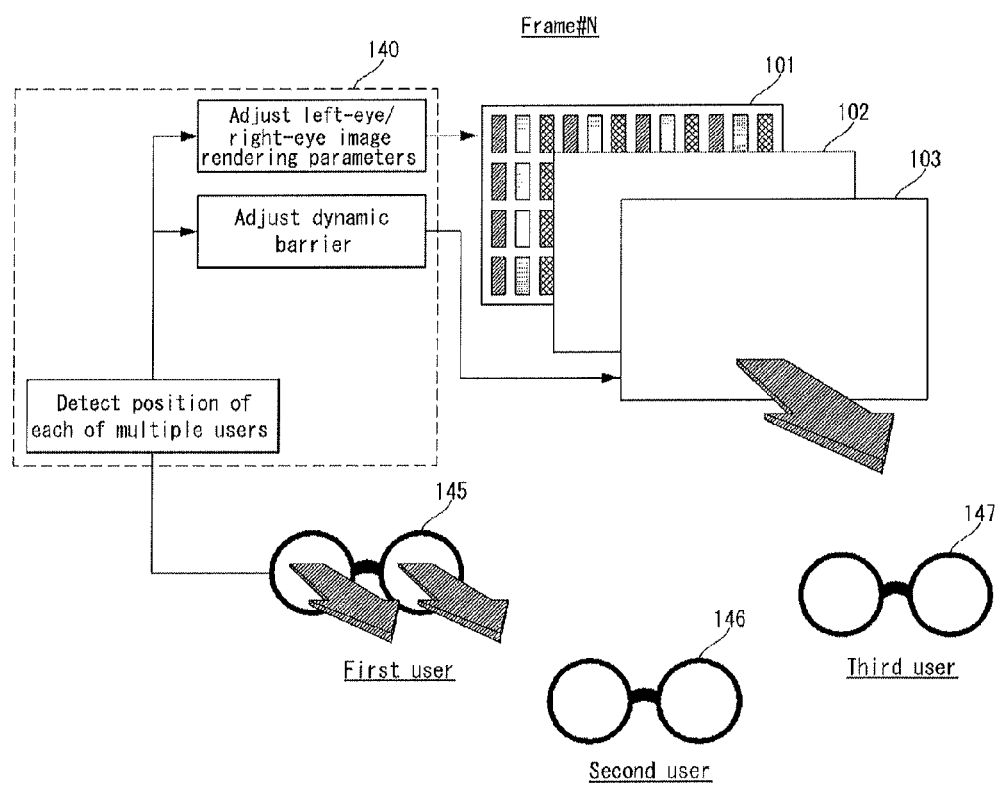
FIGS. 14a, 14b and 14c illustrate a stereoscopic image display according to a third embodiment of this disclosure.
Figure 14B:
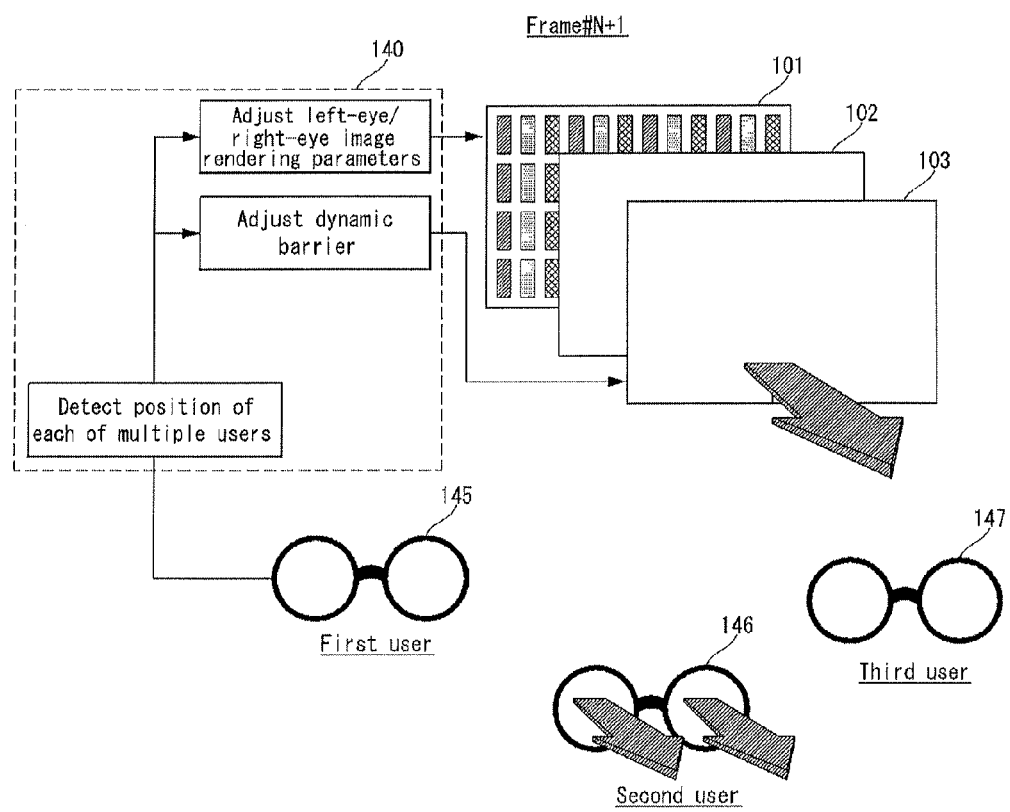
Figure 14C:
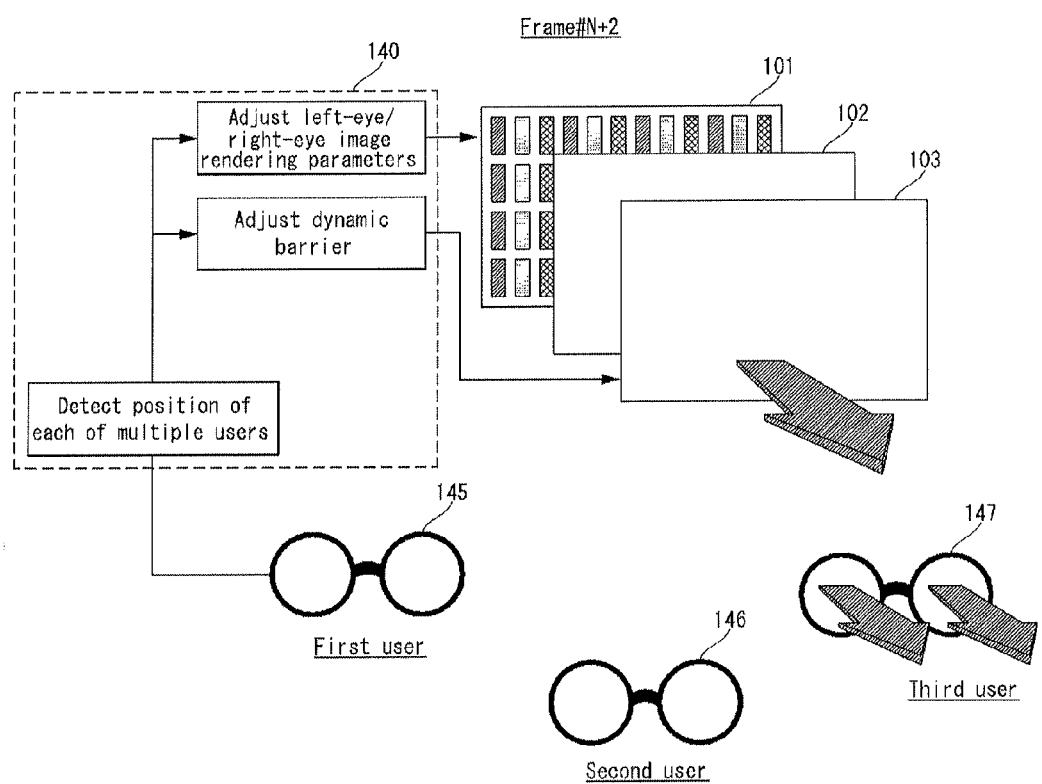

FIGS. 14A, 14B and 14C illustrate a stereoscopic image display according to a third embodiment of this disclosure.

Referring to FIGS. 14A, 14B and 14C, the stereoscopic image display according to the third embodiment of this disclosure includes the display 101, the polarizer 102, the dynamic barrier 103, a plurality of active glasses 145, 146 and 147, and a 3D controller 140. The dynamic barrier 103 and the active glasses 145, 146 and 147 are 3D driving elements which separate 3D images for respective users and produce a binocular disparity of each user.

The display 101 displays a 2D image in the 2D mode and displays a 3D image rendered according to the position of a user under the control of the 3D controller 140 in the 3D mode. The display 101 displays 3D images time-divided by users in synchronization with the active glasses 145, 146 and 147 under the control of the 3D controller 140. For example, the display 101 displays a 3D image of a first user, which is synchronized with the first active glasses 145, for an Nth frame, and then displays a 3D image of a second user, which is synchronized with the second active glasses 146, for an (N+1)th frame. Subsequently, the display 101 displays a 3D image of a third user, which is synchronized with the third active glasses 147, for an (N+2)th frame.

The dynamic barrier 103 may be implemented as a liquid crystal barrier having two transparent substrates on which electrodes are formed and a liquid crystal layer formed between the transparent substrates or a liquid crystal lens. The dynamic barrier 103 electrically controls liquid crystal molecules under the control of the 3D controller 140 to spatially divide lights of left-eye and right-eye images to produce a binocular disparity.

Each of the left and right glasses of each of the active glasses 145, 146 and 147 may be implemented as an electrically controlled optical shutter including a liquid crystal layer formed between transparent substrates on which electrodes are formed, a power supply supplying a driving voltage to the electrodes and a control circuit controlling the driving voltage under the control of the 3D controller 140. The active glasses 145, 146 and 147 are sequentially turned on/off (opened/shielded) in synchronization with 3D images time-divided by users and displayed on the display 101. For example, the left and right optical shutters of the first active glasses 145 are turned on during the Nth frame for which the 3D image of the first user is displayed to transmit light and turned off during the (N+1)th and (N+2)th frames to block light under the control of the 3D controller 140. The left and right optical shutters of the second active glasses 146 are turned on during the (N+1)th frame for which the 3D image of the second user is displayed to transmit light and turned off during the Nth and (N+2)th frames to block light under the control of the 3D controller 140. The left and right optical shutters of the third active glasses 147 are turned on during the (N+2)th frame for which the 3D image of the third user is displayed to transmit light and turned off during the Nth and (N+1)th frames to block light under the control of the 3D controller 140.

The 3D controller 140 acquires 3D position information of each user from a camera or an infrared sensor by using the aforementioned user position detection algorithm. The 3D controller 140 adjusts rendering parameters of left-eye and right-eye images according to the 3D position information of each user. In addition, the 3D controller 140 synchronizes display times of 3D images of users with turn-on times of the active glasses 145, 146 and 147 through a wired/wireless interface and transmits an optical shutter control signal for controlling turn-on/turn-off of the active glasses 145, 146 and 147 to the active glasses 145, 146 and 147 through the wired/wireless interface. For example, the 3D controller 140 displays the 3D image of the first user, which has a view angle and depth information varied according to the position of the first user, on the display 101 for the Nth frame and, simultaneously, turns on the left and right optical shutters of the first active glasses 145. The 3D controller 140 displays the 3D image of the second user, which has a view angle and depth information varied according to the position of the second user, on the display 101 for the (N+1)th frame, changes the position of the dynamic barrier 103 and, simultaneously, turns on the left and right optical shutters of the second active glasses 146. Subsequently, the 3D controller 140 displays the 3D image of the third user, which has a view angle and depth information varied according to the position of the third user, on the display 101 for the (N+2)th frame, changes the position of the dynamic barrier 103 and, simultaneously, turns on the left and right optical shutters of the third active glasses 147.

The stereoscopic image display illustrated in FIGS. 14A, 14B and 14C produces a binocular disparity of each user by using the dynamic barrier 103 and time-division-drives 3D images of users, displayed on the display, and the active glasses 145, 146 and 147 to separate the users. The stereoscopic image display can detect the position of each user and adjust the view angle and depth information of a 3D image to achieve multi-user tracking.

Figure 15A:
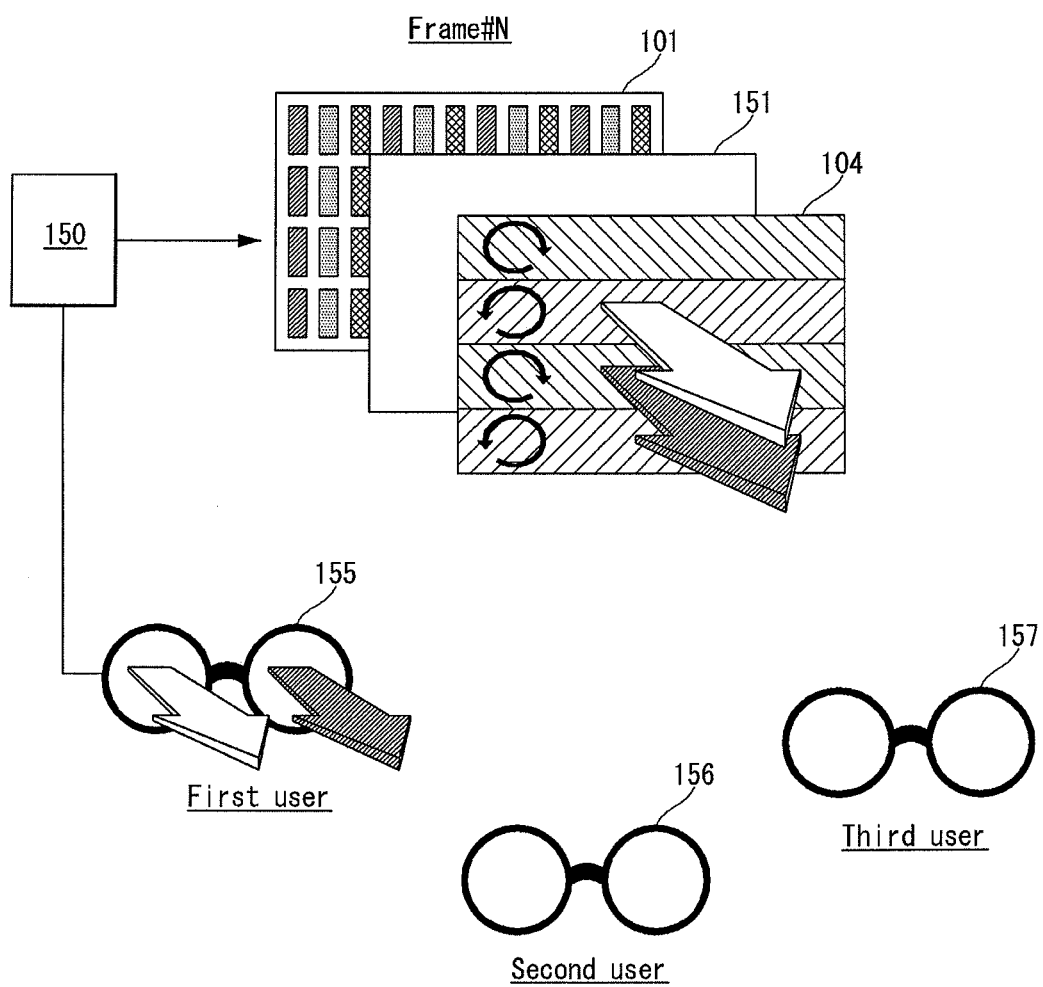
FIGS. 15a, 15b and 15c illustrate a stereoscopic image display according to a fourth embodiment of this disclosure.
Figure 15B:
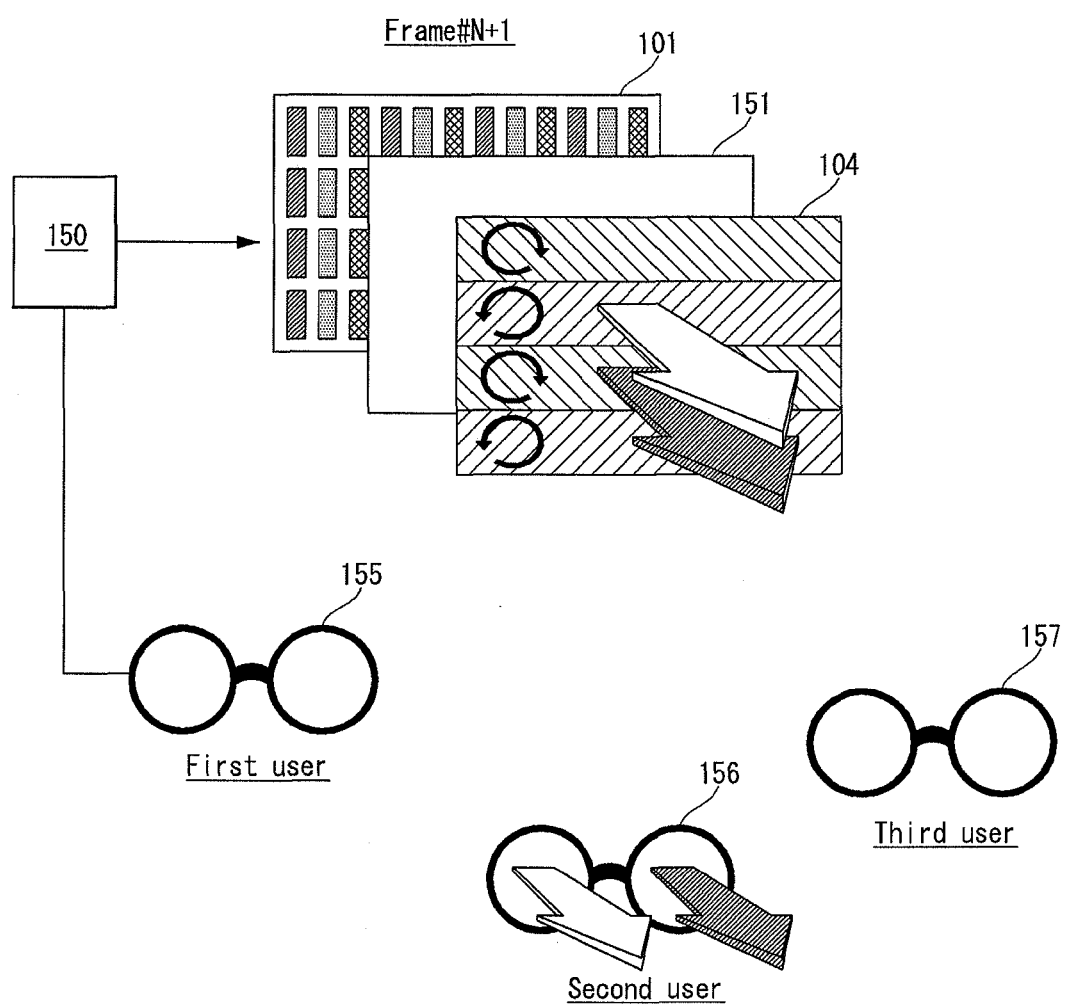
Figure 15C:
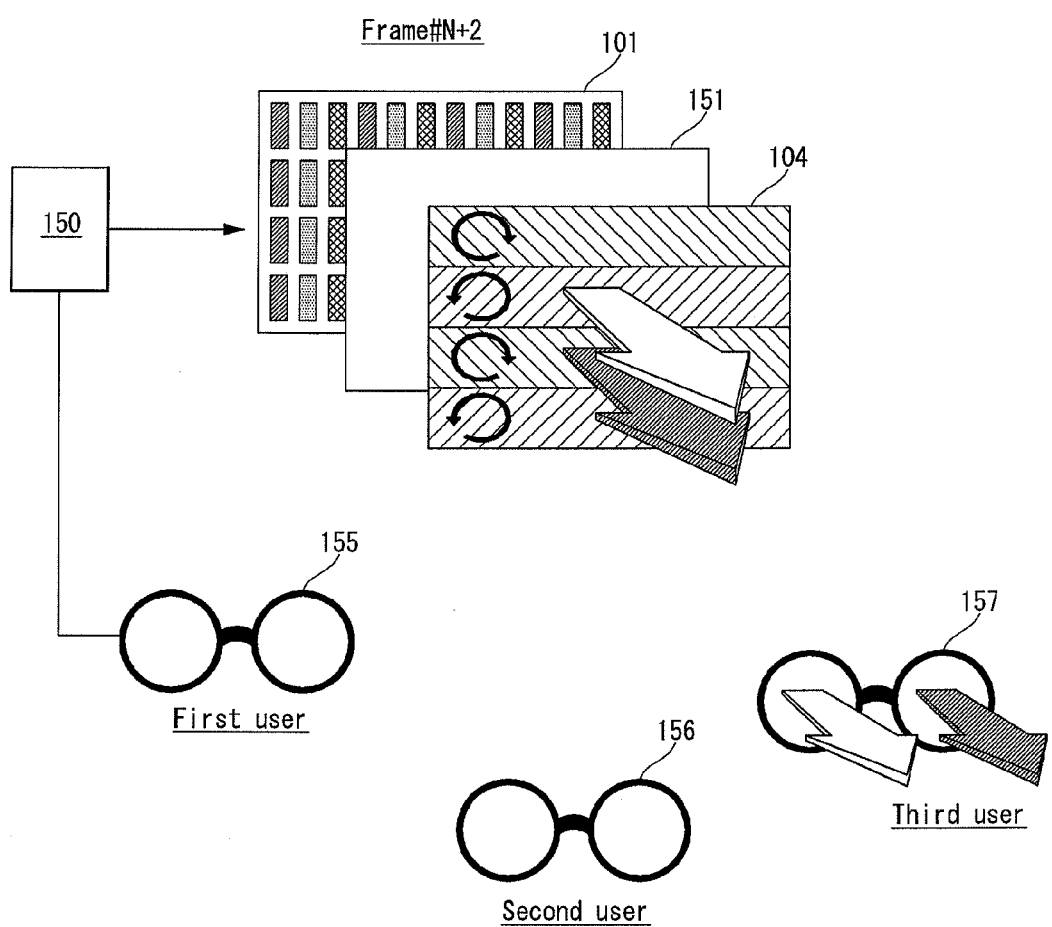

FIGS. 15A, 15B and 15C illustrate a stereoscopic image display according to a fourth embodiment of this disclosure.

Referring to FIGS. 15A, 15B and 15C, the stereoscopic image display according to the fourth embodiment of this disclosure includes the display 101, the pattern retarder 104, a plurality of active glasses 155, 156 and 157, and a 3D controller 150. The pattern retarder 104 and the active glasses 155, 156 and 157 are 3D driving elements which separate 3D images of users and produce a binocular disparity of each user.

The display 101 displays a 2D image in the 2D mode and displays a 3D image rendered according to the position of a user under the control of the 3D controller 150 in the 3D mode. The display 101 displays 3D images time-divided by users and synchronized with the active glasses 155, 156 and 157 under the control of the 3D controller 150. For example, the display 101 displays a 3D image of a first user, which is synchronized with the first active glasses 155, for an Nth frame, and then displays a 3D image of a second user, which is synchronized with the second active glasses 156, for an (N+1)th frame. Subsequently, the display 101 displays a 3D image of a third user, which is synchronized with the third active glasses 157, for an (N+2)th frame. Reference numeral '151' denotes a polarizing film arranged between a liquid crystal display panel and the pattern retarder 104.

The pattern retarder 104 includes first and second retarders having different light absorption axes and splits left-eye and right-eye images of 3D images of users into polarized lights. The first retarder is formed on an odd-numbered line of the pattern retarder 104 and transmits left-eye image light of a first polarized light (linearly polarized light or circularly polarized light) of lights received from the display 101. The second retarder is formed on an even-numbered line of the pattern retarder 104 and transmits right-eye image light of a second polarized light (linearly polarized light or circularly polarized light) of the lights received from the display 101. FIGS. 15A, 15B and 15C illustrate that the first retarder is implemented as a polarizing filter which transmits right-circularly polarized lights and the second retarder is implemented as a polarizing filter which transmits left-circularly polarized lights.

Each of the left and right glasses of each of the active glasses 155, 156 and 157 may be implemented as an electrically controlled optical shutter including a liquid crystal layer formed between transparent substrates on which electrodes are formed, a power supply supplying a driving voltage to the electrodes and a control circuit controlling the driving voltage under the control of the 3D controller 150. The left glass of each of the active glasses 155, 156 and 157 includes a polarizing film which transmits only left-eye image light of the first polarized light (right-circularly polarized light) and the right glass of each of the active glasses 155, 156 and 157 includes a polarizing film which transmits only left-eye image light of the second polarized light (left-circularly polarized light). The optical shutters of the active glasses 155, 156 and 157 are sequentially turned on/off in synchronization with 3D images time-divided by users and displayed on the display and split left-eye and right-eye images according to polarization division. For example, the left and right optical shutters of the first active glasses 155 are turned on during the Nth frame for which the 3D image of the first user is displayed to transmit light and turned off during the (N+1)th and (N+2)th frames to block light under the control of the 3D controller 150. During the Nth frame, the left optical shutter of the first active glasses 155 transmits the left-eye image of the first polarized light (right-circularly polarized light) while the right optical shutter of the first active glasses 155 transmits the right-eye image of the second polarized light (left-circularly polarized light). The left and right optical shutters of the second active glasses 156 are turned on during the (N+1)th frame for which the 3D image of the second user is displayed to transmit light and turned off during the Nth and (N+2)th frames to block light under the control of the 3D controller 150. During the (N+1)th frame, the left optical shutter of the second active glasses 156 transmits the left-eye image of the first polarized light (right-circularly polarized light) due to the first polarizing film while the right optical shutter of the second active glasses 156 transmits the right-eye image of the second polarized light (left-circularly polarized light) due to the second polarizing film. The left and right optical shutters of the third active glasses 157 are turned on during the (N+2)th frame for which the 3D image of the third user is displayed to transmit light and turned off during the Nth and (N+1)th frames to block light under the control of the 3D controller 150. During the (N+2)th frame, the left optical shutter of the third active glasses 157 transmits the left-eye image of the first polarized light (right-circularly polarized light) due to the first polarizing film while the right optical shutter of the third active glasses 157 transmits the right-eye image of the second polarized light (left-circularly polarized light) due to the second polarizing film.

The 3D controller 150 acquires 3D position information of each user from a camera or an infrared sensor by using the aforementioned user position detection algorithm. The 3D controller 150 adjusts rendering parameters of left-eye and right-eye images according to the 3D position information of each user. In addition, the 3D controller 140 synchronizes display times of 3D images of users with turn-on times of the active glasses 155, 156 and 157 through a wired/wireless interface and transmits an optical shutter control signal for controlling turn-on/turn-off of the active glasses 155, 156 and 157 to the active glasses 155, 156 and 157 through the wired/wireless interface. For example, the 3D controller 150 displays the 3D image of the first user, which has a view angle and depth information varied according to the position of the first user, on the display 101 for the Nth frame and, simultaneously, turns on the left and right optical shutters of the first active glasses 155. The 3D controller 150 displays the 3D image of the second user, which has a view angle and depth information varied according to the position of the second user, on the display 101 for the (N+1)th frame and, simultaneously, turns on the left and right optical shutters of the second active glasses 156. Subsequently, the 3D controller 150 displays the 3D image of the third user, which has a view angle and depth information varied according to the position of the third user, on the display 101 for the (N+2)th frame and, simultaneously, turns on the left and right optical shutters of the third active glasses 157.

The stereoscopic image display illustrated in FIGS. 15A, 15B and 15C produces a binocular disparity of each user according to polarization division and time-division-drives 3D images of users, displayed on the display, and the active glasses 155, 156 and 157 to separate the users. The stereoscopic image display can detect the position of each user and adjust the view angle and depth information of a 3D image to achieve multi-user tracking.

Figure 16A:
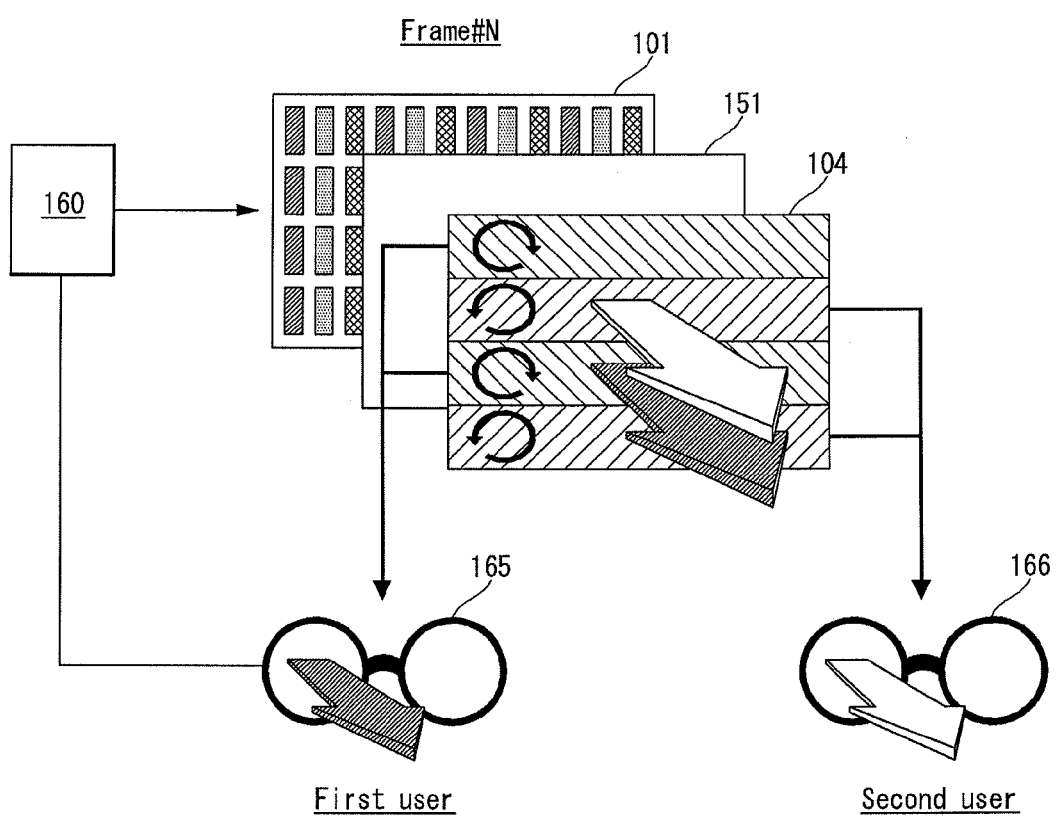
FIGS. 16a and 16b illustrate a stereoscopic image display according to a fifth embodiment of this disclosure.
Figure 16B:
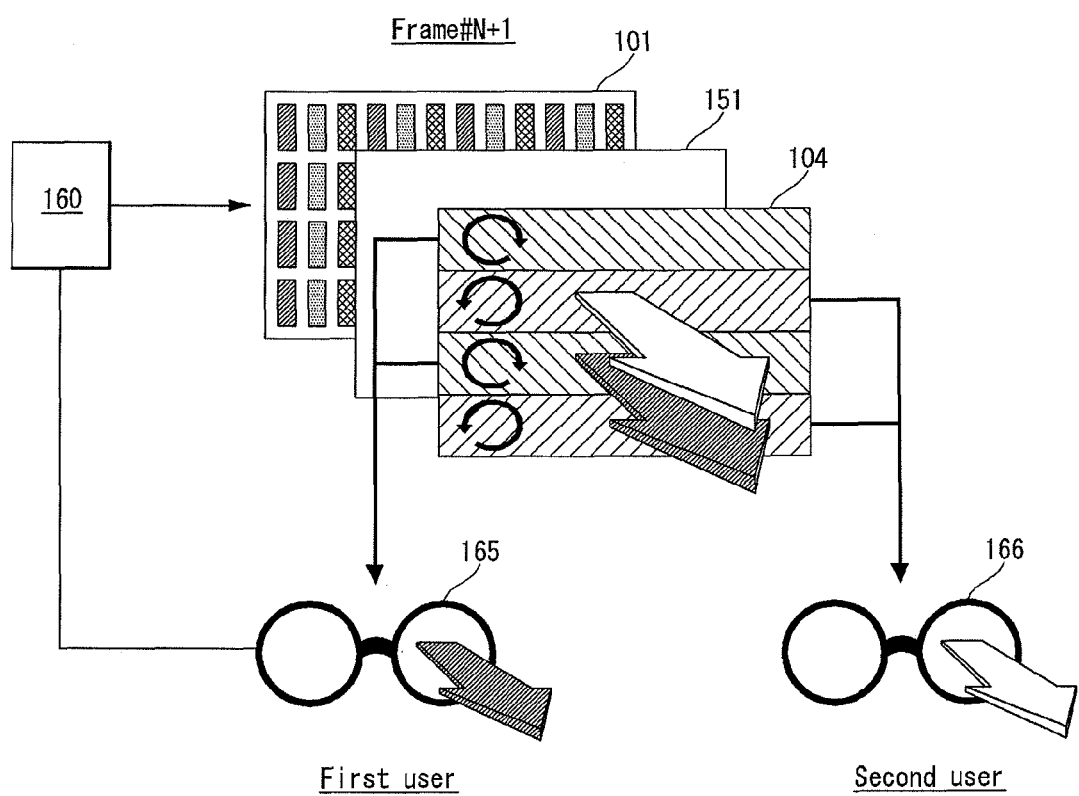

FIGS. 16A and 16B illustrate a stereoscopic image display according to a fifth embodiment of the disclosure.

Referring to FIGS. 16A and 16B, the stereoscopic image display according to the fifth embodiment of this disclosure includes the display 101, the pattern retarder 104, the polarizing film 151, a plurality of active glasses 165 and 166, and a 3D controller 160. The pattern retarder 104 and the active glasses 165 and 166 are 3D driving elements which separate 3D images for users and produce a binocular disparity of each user.

The display 101 displays a 2D image in the 2D mode and displays a 3D image rendered according to the position of a user under the control of the 3D controller 160 in the 3D mode. The display 101 time-division-displays left-eye and right-eye images of each user in synchronization with the active glasses 165 and 166 under the control of the 3D controller 160. For example, the display 101 displays the left-eye image of each user, which is synchronized with left optical shutters of the active glasses 165 and 166, for the Nth frame, and then displays the right-eye image of each user, which is synchronized with right optical shutters of the active glasses 165 and 166, for the (N+1)th frame.

The pattern retarder 104 includes first and second retarders having different light absorption axes and splits left-eye and right-eye images of 3D images of users into polarized lights. The first retarder is formed on an odd-numbered line of the pattern retarder 104 and transmits left-eye image light of a first polarized light (linearly polarized light or circularly polarized light) of lights received from the display 101. The second retarder is formed on an even-numbered line of the pattern retarder 104 and transmits right-eye image light of a second polarized light (linearly polarized light or circularly polarized light) of the lights received from the display 101. FIGS. 16A and 16B illustrate that the first retarder is implemented as a polarizing filter which transmits right-circularly polarized lights and the second retarder is implemented as a polarizing filter which transmits left-circularly polarized lights.

Each of the left and right glasses of each of the active glasses 165 and 166 may be implemented as an electrically controlled optical shutter including a liquid crystal layer formed between transparent substrates on which electrodes are formed, a power supply supplying a driving voltage to the electrodes and a control circuit controlling the driving voltage under the control of the 3D controller 160. The left and right optical shutters of the first active glasses 165 include a polarizing film which transmits only the first polarized light (right-circularly polarized light) and the left and right optical shutters of the second active glasses 166 include a polarizing film which transmits only the second polarized light (left-circularly polarized light). The left and right optical shutters of the active glasses 165 and 166 are alternately turned on/off in synchronization with left-eye and right-eye images of a 3D image time-division-displayed. For example, the left optical shutter of the first active glasses 165 is turned on during the Nth frame to transmit the left-eye image light of the first polarized light and turned off during the (N+1)th frame to block light under the control of the 3D controller 160. The right optical shutter of the first active glasses 165 is turned off during the Nth frame to block light and turned on during the (N+1)th frame to transmit the right-eye image light of the first polarized light under the control of the 3D controller 160. The left optical shutter of the second active glasses 166 is turned on during the Nth frame to transmit the left-eye image light of the second polarized light and turned off during the (N+1)th frame to block light under the control of the 3D controller 160. The right optical shutter of the second active glasses 166 is turned off during the Nth frame to block light and turned on during the (N+1)th frame to transmit the right-eye image light of the second polarized light under the control of the 3D controller 160.

The 3D controller 160 acquires 3D position information of each user from a camera or an infrared sensor by using the aforementioned user position detection algorithm. The 3D controller 160 adjusts rendering parameters of left-eye and right-eye images of a 3D image according to the 3D position information of each user. In addition, the 3D controller 160 synchronizes display times of 3D images of users with turn-on times of the active glasses 165 and 166 through a wired/wireless interface and transmits an optical shutter control signal for controlling turn-on/turn-off of the active glasses 165 and 166 to the active glasses 165 and 166 through the wired/wireless interface. For example, the 3D controller 160 displays the left-eye image of each user on the display 101 during the Nth frame and, simultaneously, turns on the left optical shutters of the active glasses 165 and 166. The 3D controller 160 displays the right-eye image of each user on the display 101 during the (N+1)th frame and, simultaneously, turns on the right optical shutters of the active glasses 165 and 166.

The stereoscopic image display illustrated in FIGS. 16A and 16B splits left-eye and right-eye images of each user according to the time division technique to produce a binocular disparity of each user and separates users according to polarization division. The stereoscopic image display can detect the position of each user and adjust the view angle and depth information of a 3D image to achieve multi-user tracking.

Although left-circular polarization and right-circular polarization division methods are exemplified as the polarization division technique in the above-described embodiments of the invention, the polarization division technique is not limited thereto. Left-circular polarization can be replaced by horizontal linear polarization (or vertical linear polarization) and right-circular polarization can be replaced by vertical linear polarization (or horizontal linear polarization).

As described above, the method of controlling view of a stereoscopic image and the stereoscopic image display using the method according to the embodiments of the invention can detect the position of each user in real time through the user position detection algorithm and change rendering parameters of 3D object images according to 3D position information of each user to provide realistic 3D images to users. Furthermore, the invention can combine spatial division, time division and polarization division to separate 3D images for users and produce a binocular disparity of each user.

While this disclosure has been particularly shown and described with reference to exemplary embodiments thereof, it will be understood by those of ordinary skill in the art that various changes in form and details may be made therein without departing from the spirit and scope of this disclosure as defined by the following claims.

The invention claimed is:

1. A method of controlling view of a stereoscopic image, the method comprising:

(a) simultaneously detecting 3D position information of a plurality of users, averaging the 3D position information detected for a predetermined frame period, generating a left eye image and a right eye image for each of the 3D position information and changing view angle and depth information of the left eye image and the right eye image displayed on a display according to the 3D position information; and (b) combining at least two of a spatial division technique spatially dividing light from the display, a time division technique temporally dividing light from the display and a polarization division technique dividing light from the display into lights having polarization characteristics, which are different from one another, to divide the left eye image and the right eye image for the each user by using the combined techniques, and producing a binocular disparity for the each user, wherein the 3D position information of each of the users includes X-axis position information of the user's face, Y-axis position information of the user's face, and Z-axis position information of the user's face, and wherein the method of step (a) includes analyzing a 3D position information detected in a current frame to determine whether a 3D position information detected in a previous frame exists, setting a first detection range to a region around a position of the user's face detected in the previous frame if the 3D position information detected in the previous frame exists in 3D position information detected in the current frame, setting a second detection range to an entire region of the user detected in the current frame if the 3D position information detected in the previous frame does not exist in the 3D position information detected in the current frame and detecting the user's face within the first or second detection range by using a face detection algorithm to extract a position of the user's face as the 3D position information.

2. The method of claim 1, wherein (b) comprises:
displaying the left eye image and the right eye image on the display;
splitting light from the display into a first polarized light and a second polarized light using a pattern retarder arranged in front of the display;
splitting lights of the left eye image and the right eye image for the each user by using first polarizing glasses, which transmit the first polarized light, and second polarizing glasses, which transmit the second polarized light; and
spatially dividing left-eye image light and right-eye image light of the left eye image and the right eye image by using a dynamic barrier, which is arranged between the display and the pattern retarder and of which position is electrically controlled.

3. The method of claim 1, wherein (b) comprises:
displaying a first 3D image on the display for a first period and then displaying a second 3D image for a second period;
time-dividing the first polarized light and the second polarized light by using a dynamic retarder arranged in front of the display and electrically controlled to change polarization characteristic of transmitting light and first and second polarizing glasses arranged in front of the dynamic retarder; and
spatially dividing left-eye and right-eye image lights of the 3D images by using a dynamic barrier, which is arranged between the display and the dynamic retarder and of which position is electrically controlled.

4. The method of claim 1, wherein (b) comprises:
displaying a first 3D image on the display for a first period and electrically controlling left and right optical shutters of first active glasses arranged in front of the display to open the left and right optical shutters of the first active glasses for the first period;
displaying a second 3D image on the display for a second period and electrically controlling left and right optical shutters of second active glasses arranged in front of the display to open the left and right optical shutters of the second active glasses for the second period; and
spatially dividing left-eye and right-eye image lights of the 3D images by using a dynamic barrier, which is arranged between the display and the active glasses and of which position is electrically controlled.

5. The method of claim 1, wherein (b) comprises:
displaying a first 3D image on the display for a first period, changing left-eye image light of the first 3D image to a first polarized light for the first period, and simultaneously, changing right-eye image light of the first 3D image to a second polarized light by using a pattern retarder arranged in front of the display, and electrically controlling left and right optical shutters of first active glasses arranged in front of the pattern retarder to open the left and right optical shutters of the first active glasses for the first period; and
displaying a second 3D image on the display for a second period, changing left-eye image light of the second 3D image to the first polarized light, and simultaneously, changing right-eye image light of the second 3D image to the second polarized light by using the pattern retarder for the first period, and electrically controlling left and right optical shutters of second active glasses arranged in front of the pattern retarder to open the left and right optical shutters of the second active glasses for the second period,
wherein the left optical shutters of the first and second active glasses include a first polarizing film, which transmits only the first polarized light, and the right optical shutters of the first and second active glasses include a second polarizing film, which transmits only the second polarized light.

6. The method of claim 1, wherein (b) comprises:
displaying left-eye images of first and second 3D images on the display for a first period, changing left-eye image light of the first 3D image to a first polarized light and changing left-eye image light of the second 3D image to a second polarized light for the first period by using a pattern retarder arranged in front of the display, and electrically controlling left optical shutters of first and second active glasses arranged in front of the pattern retarder to open the left optical shutters of the first and second active glasses for the first period; and
displaying right-eye images of the first and second 3D images on the display for a second period, changing right-eye image light of the first 3D image to the first polarized light and changing right-eye image light of the second 3D image to the second polarized light for the second period by using the pattern retarder, and electrically controlling right optical shutters of the first and second active glasses to open the right optical shutters of the first and second active glasses for the second period,
wherein the left and right optical shutters of the first active glasses include a first polarizing film, which transmits only the first polarized light, and the left and right optical shutters of the second active glasses include a second polarizing film, which transmits only the second polarized light.

7. The method of claim 1, wherein the position information of the each user is obtained from output of at least one of an image sensor and an optical sensor sensing light having a specific wavelength.

8. A stereoscopic image display device comprising:
a controller that simultaneously detects 3D position information of a plurality of users, averages the 3D position information detected for a predetermined frame period, generates a left eye image and a right eye image for each of the 3D position information, and changes view angle and depth information of the left eye image and the right eye image displayed on a display according to the 3D position information; and
a 3D driving element that divides the left eye image and the right eye image for the each user by using at least two of a spatial division technique spatially dividing light from the display, a time division technique temporally dividing light from the display and a polarization division technique dividing light from the display into lights having polarization characteristics which are different from one another, and produces a binocular disparity for the each user,
wherein the 3D position information of each of the users includes X-axis position information of the user's face, Y-axis position information of the user's face, and Z-axis position information of the user's face, and
wherein the controller analyzes a 3D position information detected in a current frame to determine whether a 3D position information detected in a previous frame exists, sets a first detection range to a region around a position of the user's face detected in the previous frame if the 3D position information detected in the previous frame exists in 3D position information detected in the current frame sets a second detection range to an entire region of the user detected in the current frame if the 3D position information detected in the previous frame does not exist in the 3D position information detected in the current frame and detects the user's face within the first or second detection range by using a face detection algorithm to extract a position of the user's face as the 3D position information.

9. The stereoscopic image display device of claim 8, wherein the 3D driving element comprises:
a pattern retarder arranged in front of the display and splitting light from the left eye image and the right eye image into a first polarized light and a second polarized light;
first polarizing glasses arranged in front of the pattern retarder and transmitting the first polarized light;
second polarizing glasses arranged in front of the pattern retarder and transmitting the second polarized light; and
a dynamic barrier arranged between the display and the pattern retarder, the position of the dynamic barrier being electrically controlled to spatially divide left-eye and right-eye image lights of the lift eye image and the right eye image displayed on the display.

10. The stereoscopic image display device of claim 8, where the 3D driving element comprises:
a dynamic retarder arranged in front of the display and electrically controlled to change light of a first 3D image displayed on the display to a first polarized light for a first period and then change light of a second 3D image displayed on the display to a second polarized light for a second period;
first polarizing glasses arranged in front of the dynamic retarder and transmitting the first polarized light;
second polarizing glasses arranged in front of the dynamic retarder and transmitting the second polarized light; and
a dynamic barrier arranged between the display and the dynamic retarder, the position of the dynamic barrier being electrically controlled to spatially divide left-eye and right-eye image lights of the 3D images displayed on the display.

11. The stereoscopic image display device of claim 8, where the 3D driving element comprises:
a dynamic barrier arranged in front of the display, the position of the dynamic barrier being electrically controlled to spatially divide left-eye and right-eye image lights of the 3D image displayed on the display;
first active glasses arranged in front of the dynamic barrier and including left and right optical shutters opened under the control of the controller; and
second active glasses arranged in front of the dynamic barrier and including left and right optical shutters opened under the control of the controller.

12. The stereoscopic image display device of claim 8, wherein the 3D driving element comprises:
a pattern retarder arranged in front of the display and splitting light from the display into a first polarized light and a second polarized light;
first active glasses arranged in front of the pattern retarder and including left and right optical shutters opened under the control of the controller; and
second active glasses arranged in front of the pattern retarder and including left and right optical shutters opened under the control of the controller,
wherein the left optical shutters of the first and second active glasses include a first polarizing film which transmits only the first polarized light and the right optical shutters of the first and second active glasses include a second polarizing film which transmits only the second polarized light.

13. The stereoscopic image display device of claim 8, further comprises at least one of an image sensor and an optical sensor for sensing light having a specific wavelength, wherein the image sensor and optical sensor detects the position information for the each user and provides the position information to the controller.

* * * * *